United States Patent [19]
Maus et al.

[11] Patent Number: 5,139,844
[45] Date of Patent: Aug. 18, 1992

[54] HONEYCOMB BODY, IN PARTICULAR CATALYST CARRIER BODY, FORMED OF A PLURALITY OF ENTWINED BUNDLES OF SHEET METAL

[75] Inventors: Wolfgang Maus, Bergisch Gladbach; Ludwig Wieres, Overath, both of Fed. Rep. of Germany

[73] Assignee: Emitec Gesellschaft für Emissionstechnologie mbH, Lohmar, Fed. Rep. of Germany

[21] Appl. No.: 410,954

[22] Filed: Sep. 22, 1989

[30] Foreign Application Priority Data

Sep. 22, 1988 [DE] Fed. Rep. of Germany ....... 3832243
Mar. 22, 1989 [EP] European Pat. Off. .. EP89/00311

[51] Int. Cl.⁵ .............................................. B32B 3/12
[52] U.S. Cl. ...................... 428/116; 428/188; 428/593; 502/439; 502/527
[58] Field of Search .................. 428/116, 188, 593; 502/439, 527

[56] References Cited

U.S. PATENT DOCUMENTS

| | | | |
|---|---|---|---|
| 3,849,076 | 11/1974 | Gryaznov et al. | 55/158 X |
| 3,938,959 | 2/1976 | Matsui et al. | 428/116 X |
| 4,280,926 | 7/1981 | Abe et al. | 428/116 X |
| 4,713,361 | 12/1987 | Maus | 428/116 X |
| 4,719,680 | 1/1988 | Cyron | 428/116 X |
| 4,839,998 | 5/1989 | Cyron | 428/116 |
| 4,886,769 | 12/1989 | Kuma et al. | 502/527 X |

FOREIGN PATENT DOCUMENTS 0245736 11/1987 European Pat. Off. .
0245737 11/1987 European Pat. Off. .

Primary Examiner—Henry F. Epstein
Attorney, Agent, or Firm—Herbert L. Lerner; Laurence A. Greenberg

[57] ABSTRACT

A honeycomb body, especially a catalyst carrier body, includes a jacket having a central region. A multiplicity of at least partially structured metal sheets define a multiplicity of channels through which fluid can flow. The metal sheets are disposed in at least three bundles in the jacket. At least three of the bundles are each folded about a respective bending line disposed in the central region and are entwined in the same direction about one another and about the central region while folded.

27 Claims, 6 Drawing Sheets

HONEYCOMB BODY, IN PARTICULAR CATALYST CARRIER BODY, FORMED OF A PLURALITY OF ENTWINED BUNDLES OF SHEET METAL

The invention relates to a honeycomb body, in particular a catalyst carrier body, including a multiplicity of metal sheets at least some of which are structured and have a multiplicity of channels through which a fluid can flow, and a jacket in which the metal sheets are disposed.

Published European Application 0 245 736 A1 discloses a honeycomb body in which the various layers of sheet metal extend in involute fashion in the outer region. Such a construction has major advantages in terms of durability in the face of alternating thermal stresses and other strains. Published European Application 0 245 737 A1, corresponding to U S. Pat. No. 4,832,998 and pending U.S. application Ser. No. 322,772, filed Mar. 13, 1989 discloses a honeycomb body that is formed of a bundle of metal sheets entwined in opposite directions. Once again that structural form has great durability in the face of alternating thermal strains. Although such a form is simple to manufacture, it is not entirely symmetrical in its construction, which must be taken into consideration in various manufacturing steps and in further processing, and is not always suitable for flexible production of special cross sections and irregular cross-sectional shapes at favorable cost.

Although the shape described in Published European Application A 0 245 736 is symmetrical in its outer region, nevertheless the shaping of the central region and corresponding manufacture are relatively complicated.

It is accordingly an object of the invention to provide a honeycomb body, in particular a catalyst carrier body, formed of a plurality of entwined bundles of sheet metal, which overcomes the hereinafore-mentioned disadvantages of the heretofore-known devices of this general type, which is largely symmetrically constructed for regular cross-sectional shapes but is easy to manufacture, and in which the excellent properties in terms of withstanding alternating thermal stress and other strains are simultaneously retained. Furthermore, the basic structure of the honeycomb body should enable production of bodies having special cross sections, and in particular irregular cross-sectional shapes, at favorable cost.

With the foregoing and other objects in view there is provided, in accordance with the invention, a honeycomb body, especially a catalyst carrier body, comprising a jacket having a central region of the honeycomb body, a multiplicity of metal sheets which are at least partially structured or at least some of which are structured, defining a multiplicity of channels through which fluid can flow, said metal sheets being disposed in at least three bundles in said jacket, at least three of said bundles each being folded about a respective bending line disposed in said central region and being entwined in the same direction about one another and about said central region while folded.

This honeycomb body, which has a multiplicity of channels through which a fluid can pass and which is particularly suitable as a catalyst carrier body or for other applications in flowing media, is formed of a multiplicity of metal sheets, at least some of them being structured, which are disposed in a jacket. The particular structures which the various metal sheets have is not important for the present invention, but only that suitable flow channels are created for a fluid. In general, smooth and corrugated sheets are used in alternating layers for such honeycomb bodies, but the invention is also applicable in the same manner to metal sheets which are structured in other ways, and also extends to these applications. For example, metal sheets with oblique or arrow-shaped corrugations, especially those which are known in the prior art, can be used. Sheet structures which are oriented transversely or obliquely relative to the flow direction, or sheets having gaps or holes, can also be used. In any case, a honeycomb body according to the invention is formed of at least three bundles of sheets, at least three of which are folded, each around a bending line in the central region of the honeycomb body, and in the folded state are entwined in the same direction around one another and around the central region with the bending lines. A construction of this kind avoids virtually all of the disadvantages that arose in previously known honeycomb bodies, and combines many advantages. For regular cross sections, such as a circle or regular polygon, a highly symmetrical structure can be attained, and with a suitable selection of the number of bundles it is also possible for all of the sheets to be of equal length and all of the bundles to form the same number of sheets. This makes the manufacturing process simpler and less expensive, and also results in low production tolerances, especially relating to possible deformation of the jacket. The novel structure does not restrict the use of known, advantageous provisions for improving the properties of the honeycomb body, and in fact favors them. Any known joining techniques, such as brazing, welding, sintering or the like, can be used with the present construction as well. Form-locking joining of the sheets to one another and/or to the jacket are also possible. A form-locking connection is one which connects two elements together due to the shape of the elements themselves, as opposed to a force-locking connection, which locks the elements together by force external to the elements. If it is practical, forms having an end surface that is conical or round-conical in cross section can also be attained, so that a telescoping effect is attained by pushing out the central region of such a honeycomb body. All in all, in terms of production versatility and performance under alternating thermal strain, the present invention combines the advantages of structures which have essential points that are described in Published European Applications 0 245 736 A1 and 0 245 737 A1.

In accordance with another feature of the invention, the at least three bundles include at least four bundles. If four or more folded, entwined bundles are used, then highly complicated cross sections can be well filled-out, as will be described in further detail in conjunction with the drawing.

In accordance with a further feature of the invention, there is provided an unfolded bundle of metal sheets extending through said central region and being entwined together with said folded bundles. The fundamental structure of the honeycomb body and its properties are retained even if a bundle extending through the central region of the honeycomb body is not folded, but has its ends entwined in common with the folded bundles. In that case, this one bundle approximately assumes the shape of an S, with the bending lines of the other bundles located in the curves of the S.

In accordance with an added feature of the invention, in the simplest case, each of said bundles is formed of alternately disposed substantially smooth and corrugated sheets.

In accordance with an additional feature of the invention, the sheets contact each other and/or said jacket at lines of contact, and said sheets are joined to one another and/or said jacket at least at some of said lines of contact by joining techniques, such as by brazing.

Securing the ends of the sheets to the jacket is sufficient for all applications. However, in accordance with yet another feature of the invention, there are provided end surfaces of the honeycomb body, at least some of said lines of contact of said sheets being brazed at least at one of said end surfaces to a depth of several millimeters. Therefore, the honeycomb bodies may be additionally brazed in a narrow circumferential region, or in discontinuous zones, or continuously, at one or both end faces or surfaces.

In accordance with yet a further feature of the invention, the jacket has a cross section with approximately the shape of a regular polygon and preferably the shape of a hexagon.

In accordance with yet an added feature of the invention, all of said sheets have approximately equal length and a middle, and at least some of said sheets are folded at a variable distances from said middle thereof.

In accordance with yet an additional feature of the invention, the jacket has an irregular cross section, and at least some of said bundles of sheets have different heights and/or contain at least some sheets of different lengths.

In accordance with still another feature of the invention, there is provided an internal tube disposed in said central region, said folded bundles having folded ends and being adapted to said internal tube.

In accordance with still a further feature of the invention, the internal tube has a circular cross section, and said bending lines of said folded bundles of sheets are disposed along an imaginary cylinder jacket concentric with said internal tube.

As will be explained in detail in conjunction with the drawing, the present invention makes it possible to fill out regular cross sections with structured sheets in a particularly simple manner, and it is also possible to provide an internal tube. Many regular cross sections, such as hexagons, can unexpectedly be filled out by equal-height bundles of sheets of equal length, which provides extreme simplification of manufacture. In the present case, the length of a sheet, in the case of structured sheets, is intended to mean not the original length, but rather the length once the structure has been produced. When regular shapes are made from bundles of sheets of equal length, these sheets cannot all always be folded in the middle. Lateral shifting of the various sheets in each bundle may be necessary, so that before folding, the bundle has a cross section with an approximately parallelogram shape.

Markedly irregular cross-sectional shapes, such as will be described below in conjunction with the drawing, can also be attained with the construction of a honeycomb body according to the invention. Since both the height of each bundle and the length of each individual sheet in each bundle can be fundamentally freely selected, and sheets of different lengths can also be disposed in a bundle with different amounts of lateral offset, the construction according to the invention offers a very wide range of versatility for uniformly filling out the most varied cross sectional shapes. A suitable configuration of bundles and their bending lines can be arrived at for virtually any desired cross-sectional shape by skilled trial and error, optionally with computer support.

A further advantage of the honeycomb body according to the invention, at least with round cross sections, is that the jacket is uniformly stressed over its entire circumference, so that it need not have any intrinsic resistance to deformation. This permits the manufacture of the jacket from very thin sheets in these cases. For example, in accordance with again another feature of the invention, the jacket is formed of a sheet being 0.1 to 1.5 mm thick and preferably approximately 1 mm or less.

In accordance with a concomitant feature of the invention, there are provided layers each being formed of at least two of said sheets, some of said layers being thicker than the others or some of said layers being formed of a plurality of identically structured sheets resting on one another. The placement of individual thicker layers of sheets between the other sheets, which is known to be advantageous, is also easily attainable. In principle, thicker layers of sheets of this kind can either be disposed in the interior or on the top or bottom of the various bundles. Furthermore, the bundles may be formed of smooth or structured sheets on the outside thereof, depending on which configuration proves to be more favorable in manufacture or in the resulting body. Preferably, efforts will always be made to have smooth and corrugated layers of sheets resting on one another in the resulting body, so that the boundary between individual bundles will no longer be apparent in the outer region of the body. To this end, the side that is on the inside when a bundle is folded may also be formed of only half of one smooth or corrugated layer, ending approximately at the bending line. However, because of the slight thickness of the sheet metal layers, such as 0.03 to 0.06 mm, it does no harm if, for instance, two smooth sheet-metal layers rest on one another at the boundary between two bundles. In the ideal case, however it will not be apparent from the outside whether or not a sheet-metal layer belongs to a particular bundle of the honeycomb body. This association can therefore be determined only from the bending line along which this sheet-metal layer is folded.

A method for manufacturing such honeycomb bodies will now be described. Through the use of this method, a plurality of bundles each being formed of a plurality of metal sheets, at least some of which are structured, is stacked together, and each bundle is folded about one bending line an simultaneously or subsequently moved with its folded edge to a central region, which may also include an internal tube. The ends of the folded bundle are entwined about one another in the same direction, which can be carrie out, for instance, by rotating the central region and contracting a shaped body surrounding the bundle. Finally, the thus-entwined bundles are pushed into a prefabricated jacket, or are enclosed by a jacket.

This makes it possible to use bundles of different heights and/or having sheets of different lengths. Additionally, the sheets in a bundle can also be laterally shifted relative to one another.

An advantage of the above-described manufacturing method is that in order to increase the production speed, three or more bundles can be produced simultaneously by different stacking machines and then combined toward a central region. This shortens the production time as compared with the manufacture of a honeycomb body from only one bundle.

Other features which are considered as characteristic for the invention are set forth in the appended claims.

Although the invention is illustrated and describe herein as embodied in a honeycomb body, in particular a catalyst carrier body, formed of a plurality of entwined bundles of sheet metal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
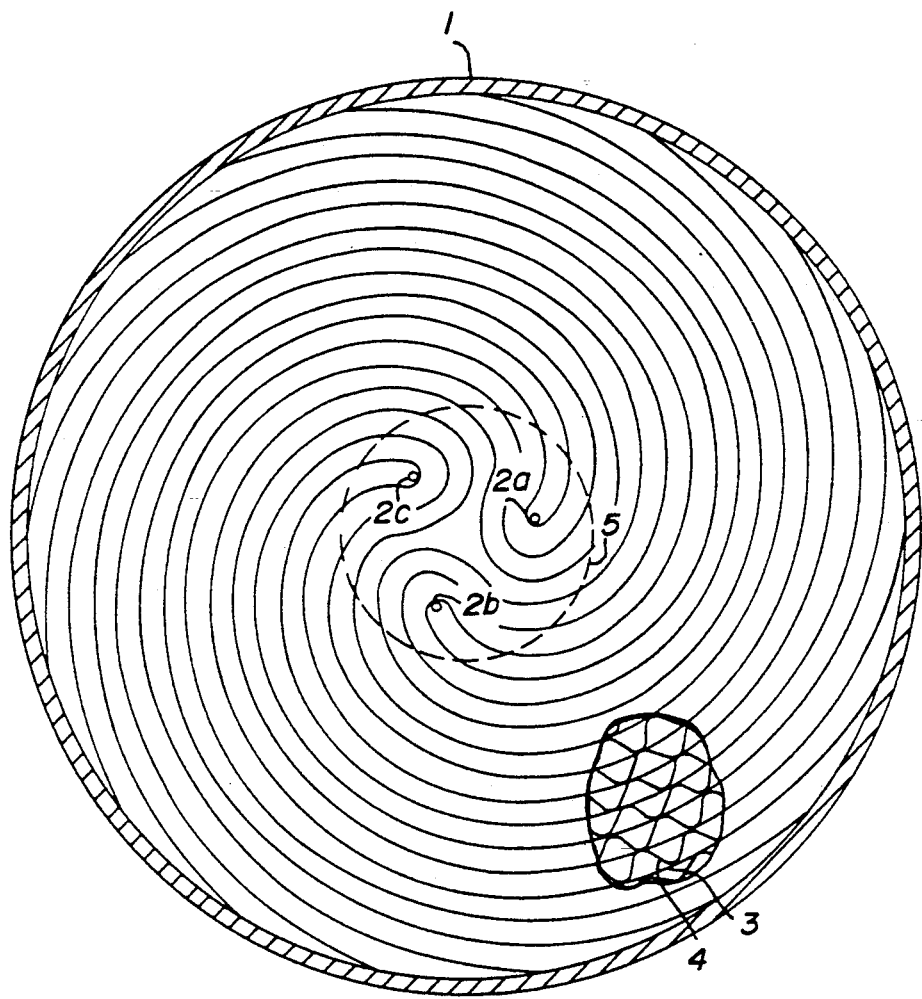
FIG. 1 is a diagrammatic, partly broken-away, cross-sectional view of a honeycomb body according to the invention.

Referring now to the figures of the drawing in detail and first, particularly, to FIG. 1 thereof, there is seen a honeycomb body made up of smooth metal sheets 3 and corrugated metal sheets 4, which are disposed in a jacket or shell 1. In the outer region of the honeycomb body, the various sheet-metal layers follow an approximately involute course, while in its interior, bending lines 2a, 2b, 2c are provided, which are three in number in the present exemplary embodiment. One-third of the sheet layers contained in the honeycomb body are folded over each of these bending lines 2a, 2b, 2c and are then entwined about one another in the same direction in this folded state in the outer region.

Figure 2:
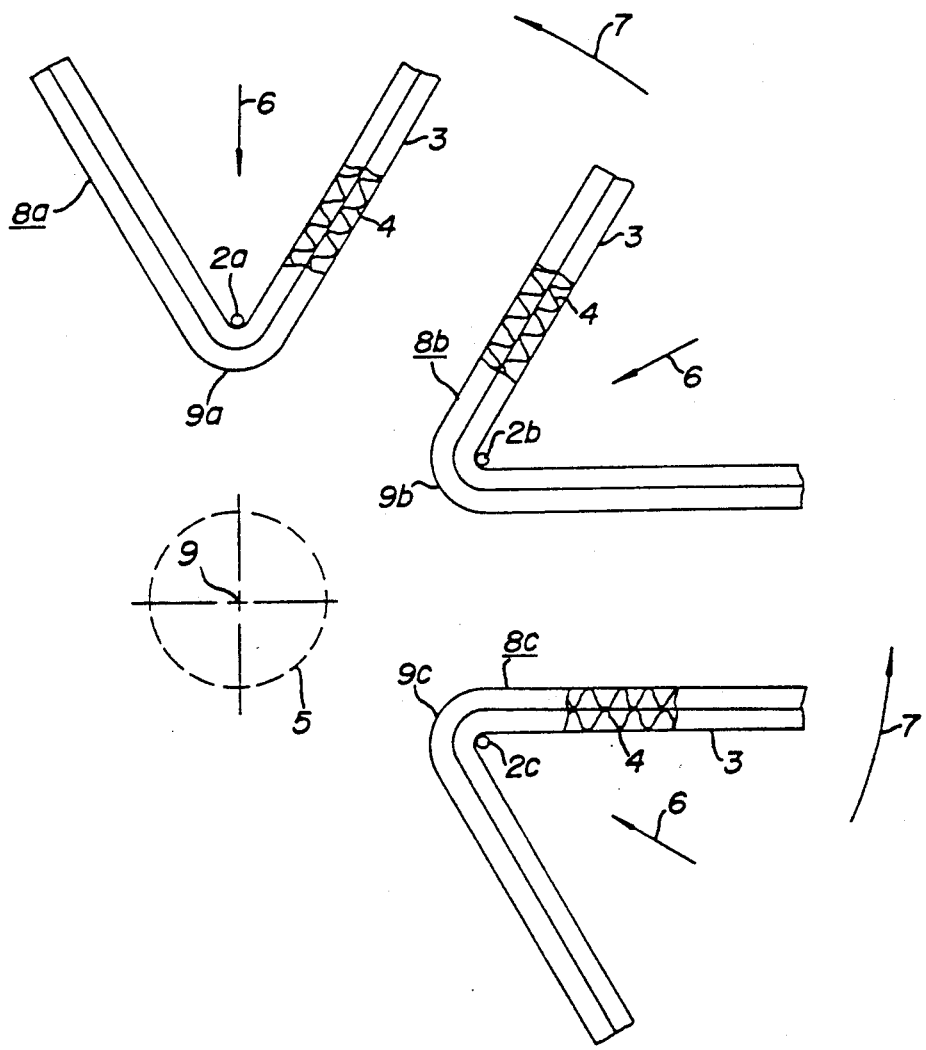
FIG. 2 is a fragmentary, partly broken-away, elevational view illustrating the production process.

The production of a honeycomb body according to the invention is diagrammatically illustrated in FIG. 2. A plurality of bundles 8a, 8b, 8c of metal sheets, only three bundles of which are shown in the FIGURE, are each folded about a respective bending line 2a, 2b and 2c. Next, or preferably even simultaneously, resultant folded edges 9a, 9b, 9c are moved to a common central region 5, as indicated by arrows 6.

Figure 7:
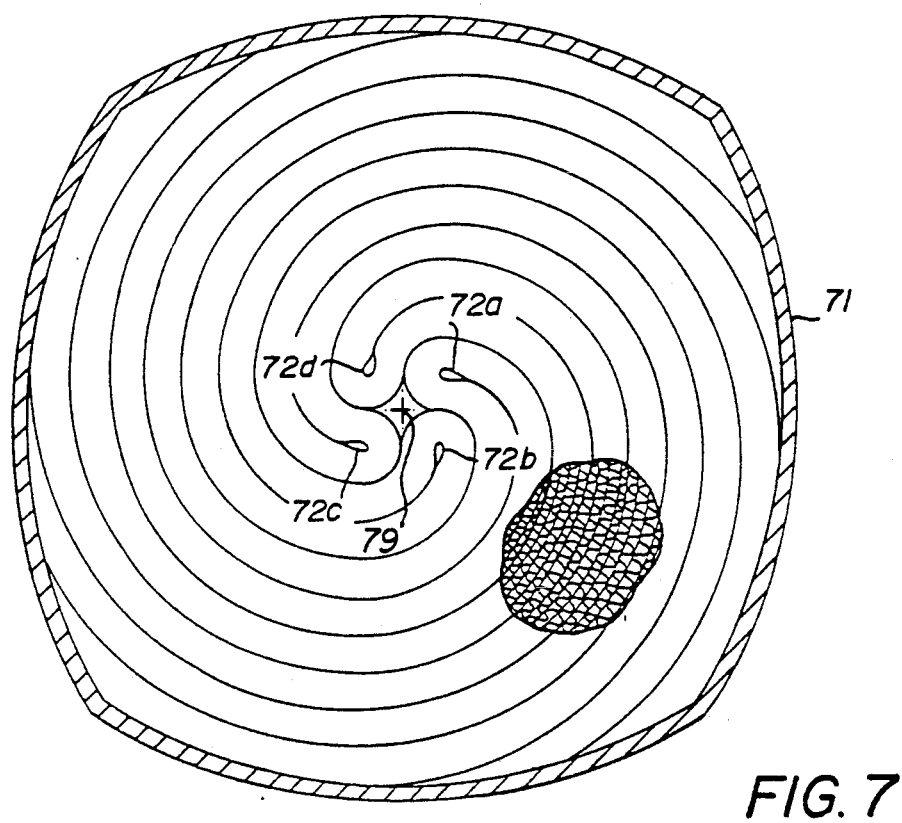
FIGS. 7 and 8 are other views similar to FIG. 1 of honeycomb bodies having regular cross sections of the type which result if a square or triangle is "inflated"
Figure 8:
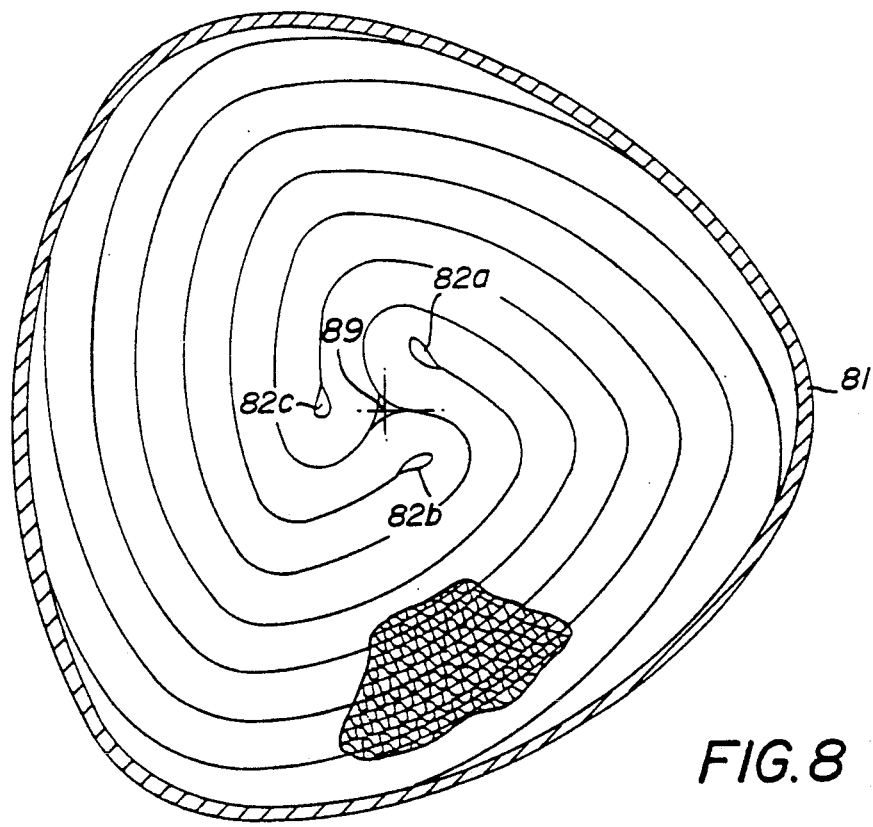
Figure 10:
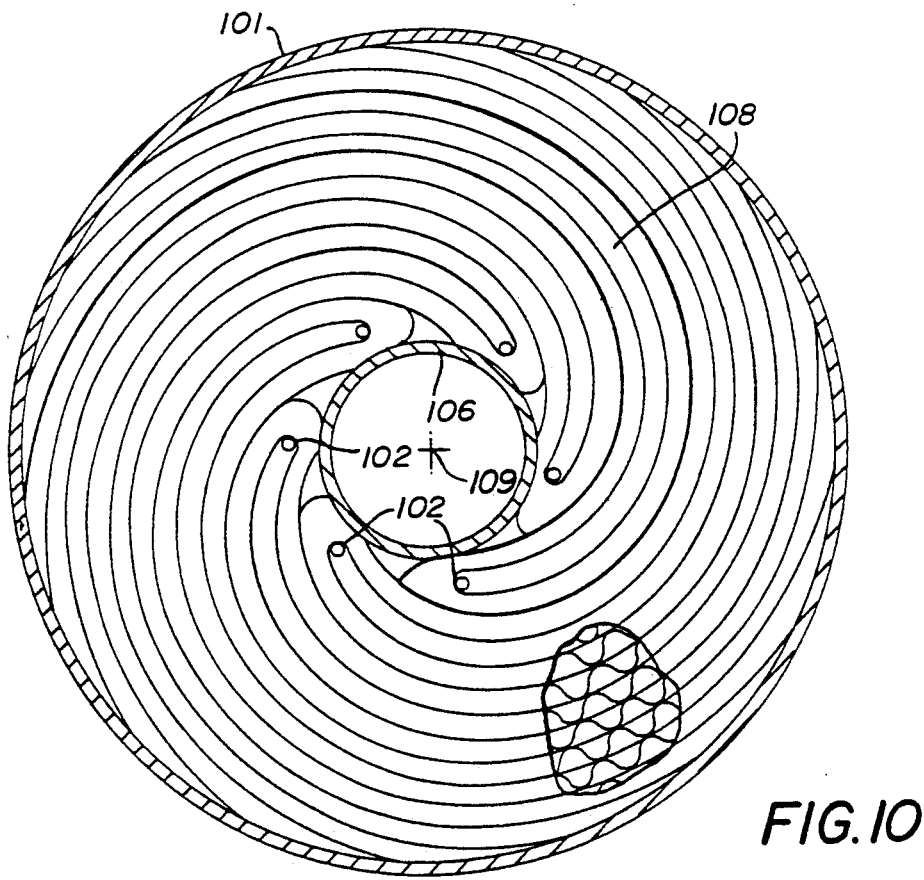
FIG. 10 is a further view similar to FIG. 1 of a honeycomb body having an internal tube.

A central axis 9 is shown in the central region 5. Corresponding central axes 79, 89 and 109 are shown in FIGS. 7, 8 and 10, respectively.

The various sheet bundles 8a, 8b, 8c about one another in the final position thereof, in the central region 5. As indicated by arrows 7, the ends of the folded bundles 8a, 8b, 8c can then be entwined about one another in the same direction. This can be accomplished by rotating the central region, for instance with a fork-like tool, and causing the contraction of a surrounding mold, and/or by holding the central region stationary and rotating a surrounding form that contracts in the process. Other options are also conceivable. In particular, the bending lines 2a, 2b, 2c can be made by fork-like tools which then also effect the entwining of the bundles by rotation.

Figure 3:
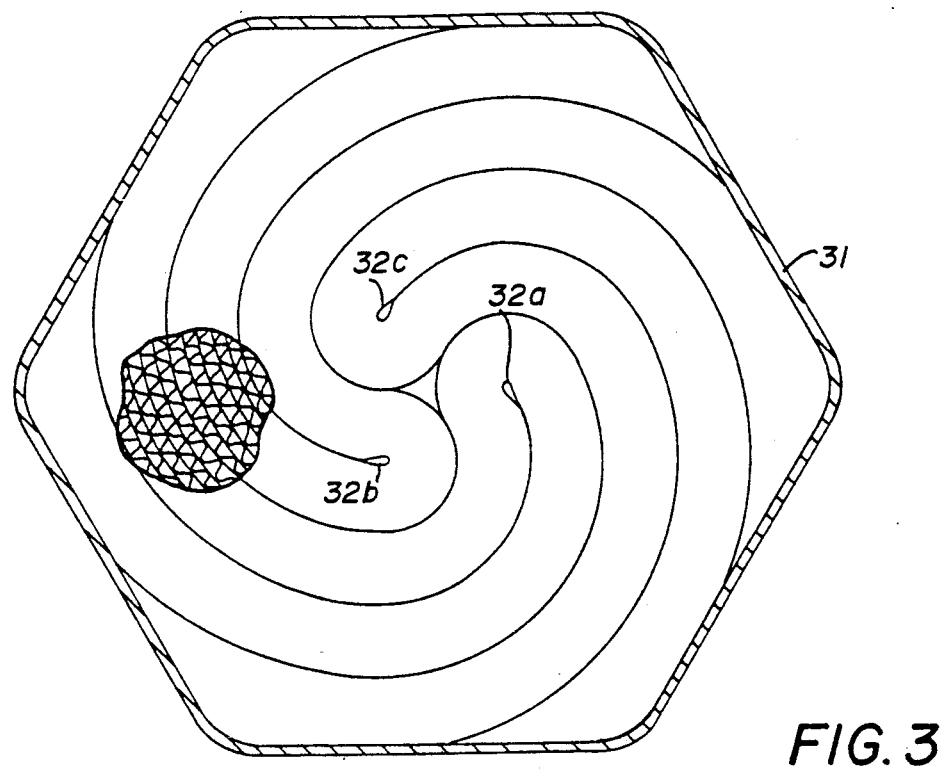
FIG. 3 is a view similar to FIG. 1 of a honeycomb body according to the invention having a hexagonal cross section.

FIG. 3 illustrates how a regular hexagon can advantageously be filled out with sheet-metal bundles. Three bundles are disposed inside a jacket 31 and are folded over bending lines 32a, 32b, 32c. Advantageously, the number of bundles used to fill out a regular polygon should equal the number of angles, or half that amount. As a result, a structure formed of bundles of equal height with sheets of equal length can be attained. The location of the bending lines with respect to the angles can also be varied in principle, and with polygons having an even number of angles it has proved advantageous to place the bending lines on the connecting planes of opposite edges of the jacket.

Figure 4:
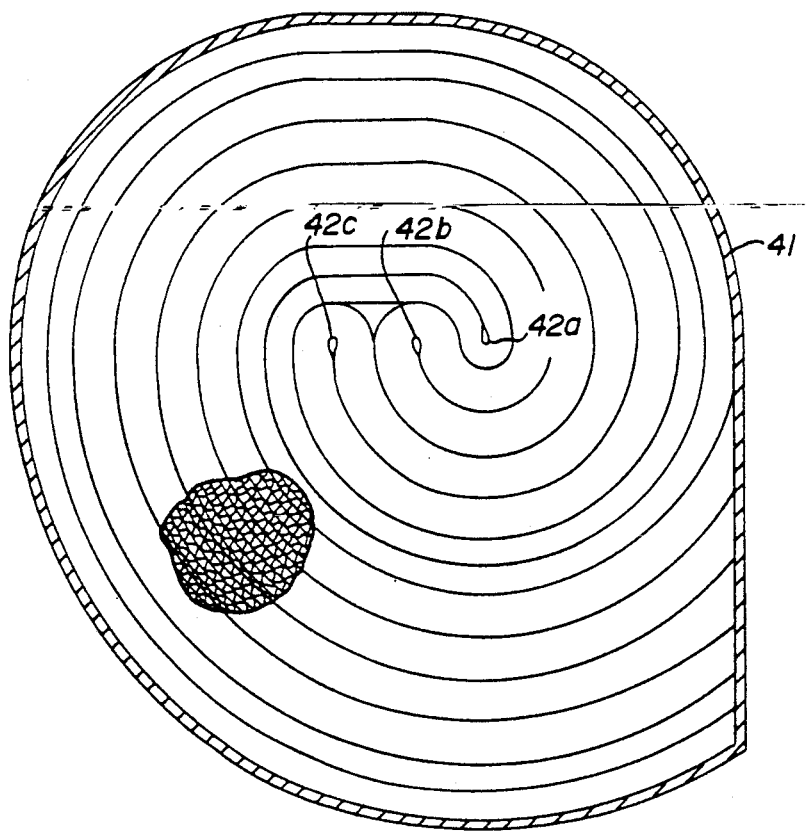
FIGS. 4 and 5 are other views similar to FIG. 1 of honeycomb bodies having irregular cross sections.

FIG. 4 shows an irregular cross-sectional shape of a honeycomb body reminiscent of a snail shell. A jacket 41 in this case can be filled out particularly favorably if one of the three bundles, namely the bundle folded over a bending line 42a, has a lesser height than two other bundles that are folded over the bending lines 42b, 42c. In such a case the three bending lines 42a, 42b, 42c are located approximately in the same plane.

Figure 5:
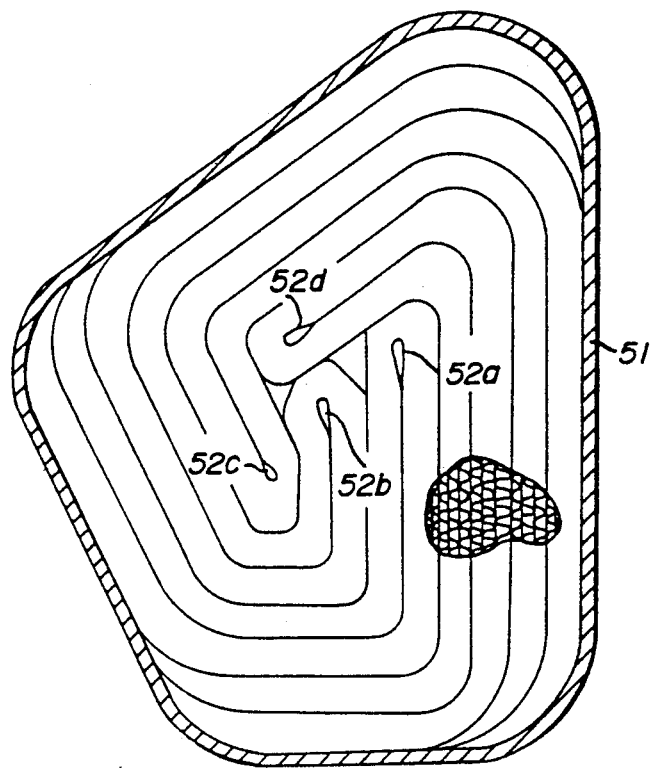

FIG. 5 shows an even more irregular cross-sectional shape of a jacket 51 and one of the options for filling this form with four bundles. Bending lines 52a, b, c, d are irregularly disposed in the central region of the honeycomb body, and this configuration can be optimized either by calculation or by systematic trial and error. It should be noted that the small remaining empty spaces see in the drawing disappear virtually completely in actual manufacture, because the bundles and layers of sheets tend to deform and fill out such empty spaces.

Figure 6:
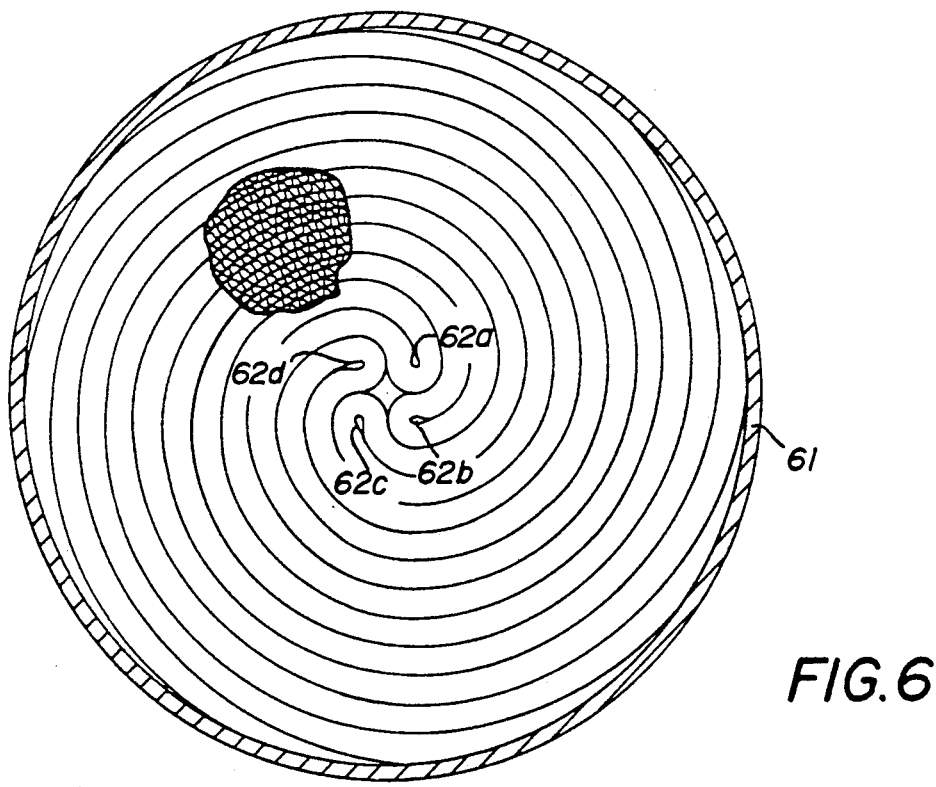
FIG. 6 is a view similar to FIG. 1 of a round honeycomb body made from four bundles.

FIG. 6 shows a highly symmetrical configuration of a round jacket 61, which is filled out with four bundles of sheets that are folded over bending lines 62a, b, c, d.

FIG. 7 shows a jacket tube 71 in the form of a distended or swollen square, which can again be filled with four bundles of sheets that are folded over bending lines 72a, b, c, d without difficulty.

FIG. 8 shows a jacket 81 having the form of a distended or swollen triangle, which is filled with three bundles of sheets that are folded over bending lines 82a, b, c. In this case the bending lines 82a, b, c are each located on the side of the center line of the body opposite a respective edge of the body. This configuration is generally suitable for regular polygons having an odd number of sides, and for the cross-sectional shapes produced from them by distending or swelling them.

Figure 9:
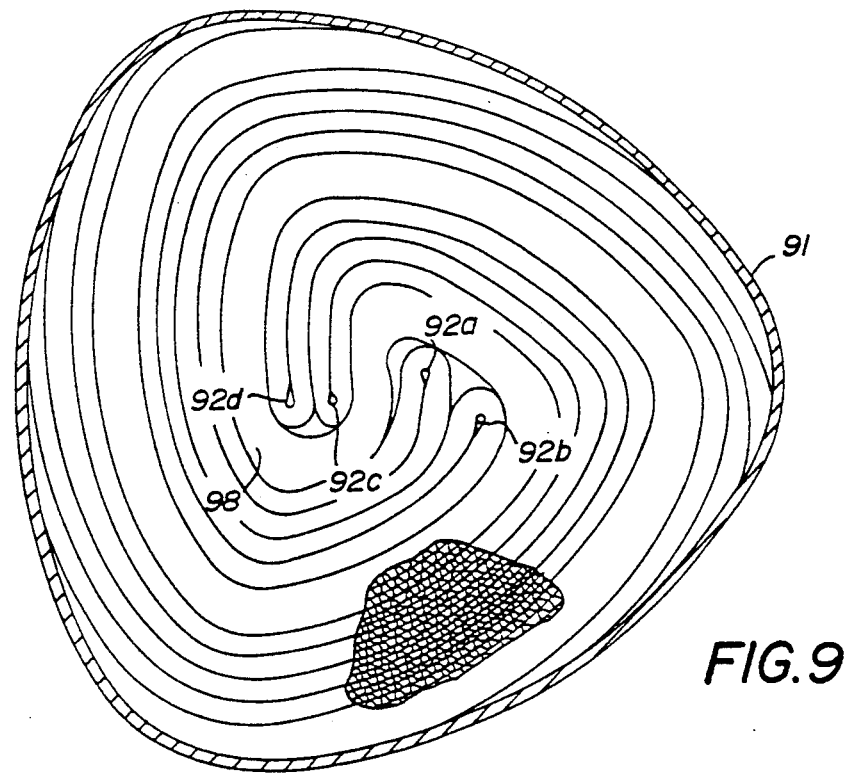
FIG. 9 is again a view similar to FIG. 1 of a honeycomb body having the same cross section as in FIG. 8, but filled out using an additional, unfolded bundle.

FIG. 9 shows an example of how an unfolded bundle 98 can be integrated in honeycomb bodies made according to the invention. In the illustrated case, a jacket 91 has the same shape as in FIG. 8, but is filled with four bundles 98 that are folded over bending lines 92a, b, c, d, and one unfolded bundle 98. It can be seen that an unfolded bundle 98 in such a configuration could always be replaced with two folded bundles abutting one another with their folded edges in the central region. However, in honeycomb bodies that are actually to be made from five or more bundles, two folded bundles should always be replaced by one unfolded bundle that is twice as thick. This does not alter the fundamental advantages of the structure, but is simply a question of production engineering.

FIG. 10 shows that the invention is also usable for making honeycomb bodies having an internal tube. In the present exemplary embodiment, the central region of the honeycomb body includes an internal tube 106, about the outside of which bending lines 102 of a plurality of folded bundles 108 are disposed. For purposes of illustration, the bundle 108 is shown as having relatively thick boundary lines, but this is not technically significant. Under some circumstances the internal tube 106 may be quite thin, and the interior thereof can also be filled with structured sheets, such as sheets that are wound in a spiral. The entire honeycomb body is surrounded by a jacket tube 101.

The present invention is particularly suitable for catalyst carrier bodies for thermally heavy duty in motor vehicles, but is not limited to this field of application, because such honeycomb bodies can also be used in other fields, for instance in handling flowing fluids.

We claim:

1. Honeycomb body, comprising a jacket having a periphery and a central region with a central axis, a multiplicity of at least partially structured metal sheets defining a multiplicity of channels through which fluid can flow, said metal sheets being disposed in at least three bundles in said jacket, at least three of said bundles each being folded about a respective bending line disposed in said central region closer to said central axis than to said periphery, and said bundles being entwined in the same direction about one another and about said central region.

2. Honeycomb body according to claim 1, wherein said at least three bundles include at least four bundles.

3. Honeycomb body according to claim 1, including an unfolded bundle of metal sheets extending through said central region and being entwined together with said folded bundles.

4. Honeycomb body according to claim 1, wherein each of said bundles is formed of alternately disposed substantially smooth and corrugated sheets.

5. Honeycomb body according to claim 1, wherein said sheets contact each other at lines of contact, and said sheets are joined to one another at least at some of said lines of contact.

6. Honeycomb body according to claim 5, wherein said sheets are joined by brazing.

7. Honeycomb body according to claim 5, including end surfaces of the honeycomb body, at least some of said lines of contact of said sheets being brazed at least at one of said end surfaces to a depth of several millimeters.

8. Honeycomb body according to claim 1, wherein said sheets contact said jacket at lines of contact, and said sheets are joined to said jacket at least at some of said lines of contact.

9. Honeycomb body according to claim 8, wherein said sheets are joined by brazing.

10. Honeycomb body according to claim 8, including end surfaces of the honeycomb body, at least some of said lines of contact of said sheets being brazed at least at one of said end surfaces to a depth of several millimeters.

11. Honeycomb body according to claim 1, wherein said sheets contact each other and said jacket at lines of contact, and said sheets are joined to on another and said jacket at least at some of said lines of contact.

12. Honeycomb body according to claim 11, wherein said sheets are joined by brazing.

13. Honeycomb body according to claim 11, including end surfaces of the honeycomb body, at least some of said lines of contact of said sheets being brazed at least at one of said end surfaces to a depth of several millimeters.

14. Honeycomb body according to claim 1, wherein said jacket has a cross section With approximately the shape of a regular polygon.

15. Honeycomb body according to claim 1, wherein said jacket has a cross section With approximately the shape of a hexagon.

16. Honeycomb body according to claim 1, wherein all of said sheets have approximately equal length and a middle, and at least some of said sheets are folded at variable distances from said middle thereof.

17. Honeycomb body according to claim 1, wherein said jacket has an irregular cross section, an at least some of said bundles of sheets have different heights.

18. Honeycomb body according to claim 1, wherein said jacket has an irregular cross section, and at least some of said bundles of sheets contain at least some sheets of different lengths.

19. Honeycomb body according to claim 1, wherein said jacket has an irregular cross section, and at least some of said bundles of sheets have different heights and contain at least some sheets of different lengths.

20. Honeycomb body according to claim 1, Wherein said jacket is formed of a sheet being 0.1 to 1.5 mm thick.

21. Honeycomb body according to claim 1, wherein said jacket is formed of a sheet being approximately 1 mm thick.

22. Honeycomb body according to claim 1, including layers each being formed of at least two of said sheets, some of said layers being thicker than the others.

23. Honeycomb body according to claim 1, including layers each being formed of at least two of said sheets, some of said layers being formed of a plurality of identically structured sheets resting on one another.

24. Honeycomb body according to claim 1, including an internal tube disposed in said central region, said folded bundles having folded ends and being adapted to said internal tube.

25. Honeycomb body according to claim 24, wherein said internal tube has a circular cross section, and said bending lines of said folded bundles of sheets are disposed along a cylinder jacket concentric with said internal tube.

26. Honeycomb body according to claim 1, wherein said bending lines are disposed closer to one another than to said periphery.

27. Catalyst carrier body, comprising a jacket having a periphery and a central region with a central axis, a multiplicity of at least partially structured metal sheets defining a multiplicity of channels through which fluid can flow, said metal sheets being disposed in at least three bundles in said jacket, at least three of said bundles each being folded about a respective bending line disposed in said central region closer to said central axis than to said periphery, and said bundles being entwined in the same direction about one another and about said central region.

* * * * *